United States Patent

Miyagi

[11] Patent Number: 6,088,601
[45] Date of Patent: Jul. 11, 2000

[54] SOUND ENCODER/DECODER CIRCUIT AND MOBILE COMMUNICATION DEVICE USING SAME

[75] Inventor: Satoru Miyagi, Kawasaki, Japan

[73] Assignee: Fujitsu Limited, Kawasaki, Japan

[21] Appl. No.: 09/025,650

[22] Filed: Feb. 18, 1998

[30] Foreign Application Priority Data

Apr. 11, 1997 [JP] Japan ................................ 9-094201

[51] Int. Cl.[7] .................................................. H04B 1/38
[52] U.S. Cl. ........................... 455/574; 455/343; 704/215
[58] Field of Search ................................ 455/79, 343, 422, 455/574, 575, 572; 704/201, 215, 219, 226, 227, 228, 211; 326/17, 18, 19, 65, 70, 76, 77

[56] References Cited

U.S. PATENT DOCUMENTS

| 5,152,007 | 9/1992 | Uribe | 405/116 |
| 5,509,102 | 4/1996 | Sasaki | 704/219 |
| 5,553,190 | 9/1996 | Ohya | 704/201 |
| 5,657,421 | 8/1997 | Lorenz et al. | 704/223 |
| 5,687,283 | 11/1997 | Wake | 704/215 |
| 5,809,460 | 9/1998 | Hayata et al. | 704/225 |
| 5,822,725 | 10/1998 | Komatsu et al. | 704/226 |
| 5,890,109 | 3/1999 | Walker et al. | 704/215 |
| 5,953,694 | 9/1999 | Pillecamp | 704/201 |
| 5,974,374 | 10/1999 | Wake | 704/215 |

*Primary Examiner*—Dwayne D. Bost
*Assistant Examiner*—Sonny Trinh
*Attorney, Agent, or Firm*—Staas & Halsey, LLP

[57] ABSTRACT

It is judged before encoding sound data whether one frame of the sound data for transmission is silent, and if judged as silent, switching circuits 202 and 203, which is for stopping/resuming electric power supply to a circuit 201 for encoding the sound data, are turned off by a power control circuit 30A during an encoding period of one frame. The power control circuit 30A consists of a counter 32 initialized by a frame synchronization pulse FSYNC and counting a sound sampling clock CLKS, a constant setting part 34, a comparator 33 activating a coincident signal EQ when a count of the counter 32 coincides with a set value, and a flip-flop 31 set by a no-voice detect pulse NOV and reset when EQ is activated.

11 Claims, 7 Drawing Sheets

SOUND ENCODER/DECODER CIRCUIT AND MOBILE COMMUNICATION DEVICE USING SAME

BACKGROUND OF THE INVENTION

1. Field of the Invention

The present invention relates to a sound coder/decoder circuit and a mobile communication device using same.

2. Description of the Related Art

To meet a demand for driving a battery for long hours, a mobile communication device, particularly a mobile telephone must operate with a further lower power consumption.

FIG. 7 shows a schematic structure of a conventional mobile communication device.

A sound inputted to a microphone 10 is converted into an electric signal and provided to an audio interface 11. The audio interface 11 amplifies the signal, digitizes the signal with sampling it, and provides the signal as sound data PCM1 to a sound coder/decoder circuit (CODEC) 12. The circuit 12 encodes the sound data PCM1 in order to reduce a data volume and correct an error, and provides the same as encoded data TCH1 to a frame assemble/disassemble circuit 13. The circuit 13 multiplexes control data over the encoded data TCH1 so that the data are formed into frames, and performs time compression of the frames and provides the frames to a modem 14 at a rate of one frame/20 ms, for instance. A processing at the frame assemble/disassemble circuit 13 is TDMA (time division multiple access) or CDMA (code division multiple access). The multiplex data are modulated at the modem 14, amplified and converted into an electric wave at an RF circuit 15, and transmitted from an antenna 16.

A signal received through the antenna 16 at the RF circuit 15 is selected as to a frequency by a band pass filter and amplified, demodulated at the modem 14, separated at the frame assemble/disassemble circuit 13 into control data and encoded data TCH2, and the encoded data TCH2 are provided to the sound coder/decoder circuit 12. The circuit 12 decodes the data TCH2 to convert into sound data PCM2, and provides the sound data PCM2 to the audio interface 11. The audio interface 11 converts the sound data PCM2 into an analog signal, and provides it through a low pass filter and an amplifier to a speaker 17.

If the sound data PCM1 from the audio interface 11 are silent data, it is not necessary for the sound coder/decoder circuit 12 to convert the sound data PCM1 into the encoded data TCH1. If silent PCM1 are converted, a wasteful consumption of electric power results.

SUMMARY OF THE INVENTION

Accordingly, an object of the present invention is to provide a sound coder/decoder circuit and a mobile communication device using same which are possible to reduce such a wasteful consumption of electric power.

In the 1st aspect of the present invention, there is provided a sound coder/decoder circuit for encoding sound data to be transmitted and decoding received and encoded sound data, during each one cycle, comprising: silent judging means for making a judgement whether the sound data to be transmitted within the one cycle are silent data, before encoding the sound data to be transmitted; a controlled circuit having a circuit for encoding the sound data to be transmitted and having a switching circuit for powering on/off the circuit for encoding; and power controlling means for turning off the switching circuit to power off the circuit for encoding during a time for encoding within the one cycle, when the judgement is that the sound data to be transmitted are silent data.

According to the 1st aspect of the present invention, since unnecessary encoding of silent sound data is avoided by cutting off electric power supply, a leak current at controlled circuits is prevented as well and a wasteful consumption of electric power is reduced, which contributes to extend battery driving hours longer.

In the 2nd aspect of the present invention, there is provided a sound coder/decoder circuit as defined in the 1st aspect, wherein the one cycle is a cycle of a frame synchronization pulse, and the decoding is performed before the judgement is made, and wherein the power controlling means includes a flip-flop circuit to be set to one state so as to cause the switching circuit to turn off when the judgement is that the sound data to be transmitted are silent data and to be set to another state by the frame synchronization pulse so as to cause the switching circuit to turn on.

According to the 2nd aspect of the present invention, the structure of the power control means can be simplified.

In the 3rd aspect of the present invention, there is provided a sound coder/decoder circuit as defined in the 1st aspect, wherein the one cycle is a cycle of a frame synchronization pulse, and wherein the power control means includes: a counter circuit for counting a clock, the counter circuit being initialized by the frame synchronization pulse; a constant setting part for providing a set value; a comparator circuit for activating a coincident signal when a count of the counter circuit coincides with the set value; and a flip-flop circuit to be set to one state so as to cause the switching circuit to turn off when the judgement is that the sound data to be transmitted are silent data and to be set to another state so as to cause the switching circuit to turn on when the coincident signal becomes activate.

According to the 3rd aspect of the present invention, in such a case where decoding is to be performed after encoding or where post-processing such as restoration of saved data is to be performed after resuming electric power supply as well, it is possible to avoid unnecessary encoding of silent sound data by cutting off electric power supply.

In the 4th aspect of the present invention, there is provided a sound coder/decoder circuit as defined in the 3rd aspect, further comprising: an MPU; a memory; and a serial-parallel converter circuit for converting the sound data to be transmitted from serial data into parallel data, providing a DMA request signal to the MPU and transmitting the sound data converted into the parallel data to the memory with DMA mode; wherein the clock is the DMA request signal.

According to the 4th aspect of the present invention, it is not necessary to frequency-divide the system clock to generate a new special-purpose clock, and therefore, it is possible to effectively use the DMA request signal which is used at other circuit.

In the 5th aspect of the present invention, there is provided a sound coder/decoder circuit as defined in the 3rd aspect, further comprising: an MPU; a memory; and a parallel-serial converter circuit for providing a DMA request signal to the MPU, reading decoded sound data from the memory with DMA mode and converting the sound data which are read from the memory from parallel data into serial data; wherein the clock is the DMA request signal.

According to the 5th aspect of the present invention as well, it is not necessary to frequency-divide the system clock to generate a new special-purpose clock, and therefore, it is possible to effectively use the DMA request signal which is used at other circuit.

In the 6th aspect of the present invention, there is provided a sound coder/decoder circuit as defined in the 3rd aspect, wherein the clock is a sound sampling pulse for generating the sound data to be transmitted.

According to the 6th aspect of the present invention as well, it is not necessary to frequency-divide the system clock to generate a new special-purpose clock, and therefore, it is possible to effectively use the sound sampling pulse which is used at other circuit.

In the 7th aspect of the present invention, there is provided a sound coder/decoder circuit as defined in the 1st aspect, wherein the controlled circuit includes a plurality of circuits each of which have a switching MOS transistor of the switching circuit and have a CMOS circuit serially connected to the switching MOS transistor, the switching MOS transistor being turned on/off so as to turned on/off the switching circuit, the circuit for encoding including the CMOS circuit.

According to the 7th aspect of the present invention, a circuit which is to hold data can be easily removed from circuits which are to be switched on/off, and therefore, saving and restoration of data described above is not necessary.

In the 8th aspect of the present invention, there is provided a mobile communication device comprising a sound coder/decoder circuit for encoding sound data to be transmitted and decoding received and encoded sound data, during each one cycle, the sound coder/decoder circuit including: silent judging means for making a judgement whether the sound data to be transmitted within the one cycle are silent data, before encoding the sound data to be transmitted; a controlled circuit having a circuit for encoding the sound data to be transmitted and having a switching circuit for powering on/off the circuit for encoding; and power controlling means for turning off the switching circuit to power off the circuit for encoding during a time for encoding within the one cycle, when the judgement is that the sound data to be transmitted are silent data.

DESCRIPTION OF THE PREFERRED EMBODIMENTS

Figure 1:
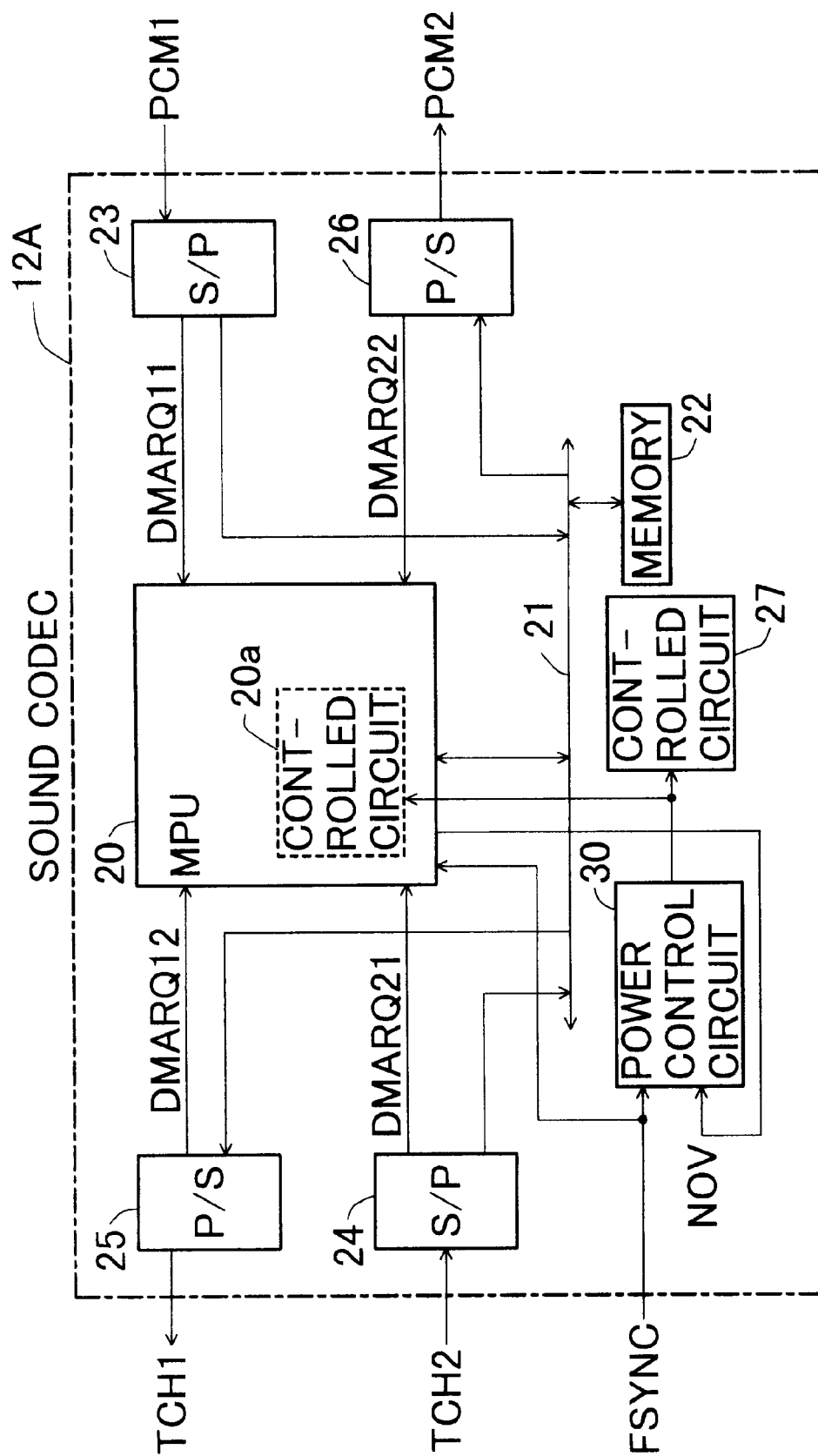
FIG. 1 is a block diagram showing a schematic structure of a sound coder/decoder circuit according to a first embodiment of the present invention.

Referring now to the drawings, wherein like reference characters designate like or corresponding parts throughout several views, preferred embodiments of the present invention are described below.

First Embodiment

Figure 7:
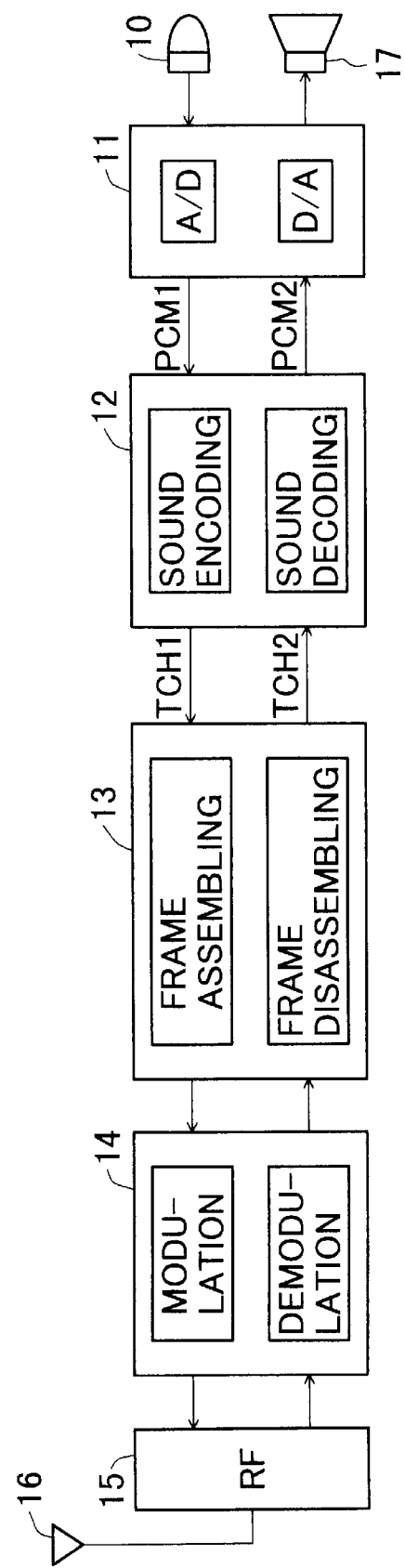
FIG. 7 is a schematic diagram of a prior art mobile communication device.

FIG. 1 shows a schematic structure of a sound coder/decoder circuit 12A which is used instead of the circuit 12 shown in FIG. 7. The circuit 12A is a digital signal processor (DSP), for example.

Data inputted to and outputted from the sound coder/decoder circuit 12A are bit streams, whereas within the circuit 12A, parallel data in a memory 22 are processed by an MPU 20 through a bus 21, therefore the circuit 12A comprises S/P converter circuits 23 and 24 and P/S converter circuits 25 and 26. After receives a DMA request signal, the MPU 20 release the bus 21, a DMA controller not illustrated writes data from the S/P converter circuit 23 or 24 into the memory 22 and reads data from the memory 22 into the P/S converter circuits 25 or 26. The MPU 20 operates in accordance with contents of a program ROM not illustrated.

The sound coder/decoder circuit 12A encodes sound data PCM1 into encoded data TCH1 and transmits TCH1 in the following manner.

The sound data PCM1 are provided from the audio interface 11 of FIG. 7 into the S/P converter circuit 23 of the sound coder/decoder circuit 12A of FIG. 1, in sound sampling cycles. The S/P converter circuit 23 converts the sound data PCM1 into parallel data, and provides a DMA request signal DMARQ11 to the MPU 20. The MPU 20 releases the bus 21 for the S/P converter circuit 23, and the parallel data are transmitted to and written in the memory 22 through the bus 21 with direct memory access mode. In the meantime, the MPU 20 sets a initial write address in the DMA controller described above, and following that, the write address is incremented within the DMA controller every time transmission is executed. The MPU 20 reads the sound data PCM1 which were written in the memory 22 during an immediately preceding frame period, converts the sound data PCM1 into the encoded data TCH1 described above, and writes the encoded data TCH1 in the memory 22.

The bus 21 is released for the P/S converter circuit 25 in response to a DMA request signal DMARQ12 which is provided to the MPU 20 from the P/S converter circuit 25, and the encoded data TCH1 which were written in the memory 22 during an immediately preceding frame period are read into the P/S converter circuit 25 from the memory 22 with DMA mode. The P/S converter circuit 25 converts the encoded data TCH1 into a bit stream.

The sound coder/decoder circuit 12A decodes encoded data TCH2 into the sound data PCM2 and transmits the encoded data TCH2 in the following manner, in an opposite order to the above.

The encoded data TCH2 are provided from the frame assemble/disassemble circuit 13 of FIG. 7 to the S/P converter circuit 24 of the sound coder/decoder circuit 12A of FIG. 1. The S/P converter circuit 24 converts the encoded data TCH2 into parallel data, and a DMA request signal DMARQ21 is provided to the MPU 20. This releases the bus 21 for the S/P converter circuit 24, and the parallel data are transmitted to and written in the memory 22 through the bus 21 with DMA mode. The MPU 20 reads the encoded data TCH2 which were written in the memory 22 during an immediately preceding frame period, converts the encoded data TCH2 into the sound data PCM2, and writes the sound data PCM2 in the memory 22.

The bus 21 is released for the P/S converter circuit 26 in response to a DMA request signal DMARQ22 which is provided to the MPU 20 from the P/S converter circuit 26, and the sound data PCM2 which were written in the memory 22 during an immediately preceding frame period are read into the P/S converter circuit 26 from the memory 22 through DMA. The P/S converter circuit 26 converts the sound data PCM2 into a bit stream.

Disposed within and outside the MPU 20 are circuits 20a and 27 which are used in the process of encoding. To control electric power which is supplied to the circuits 20a and 27, the sound coder/decoder circuit 12A comprises a power control circuit 30. The power control circuit 30 receives a no-voice detect pulse NOV from the MPU 20, while receiving a frame synchronization pulse FSYNC from the frame assemble/disassemble circuit 13 of FIG. 7.

Figure 2:
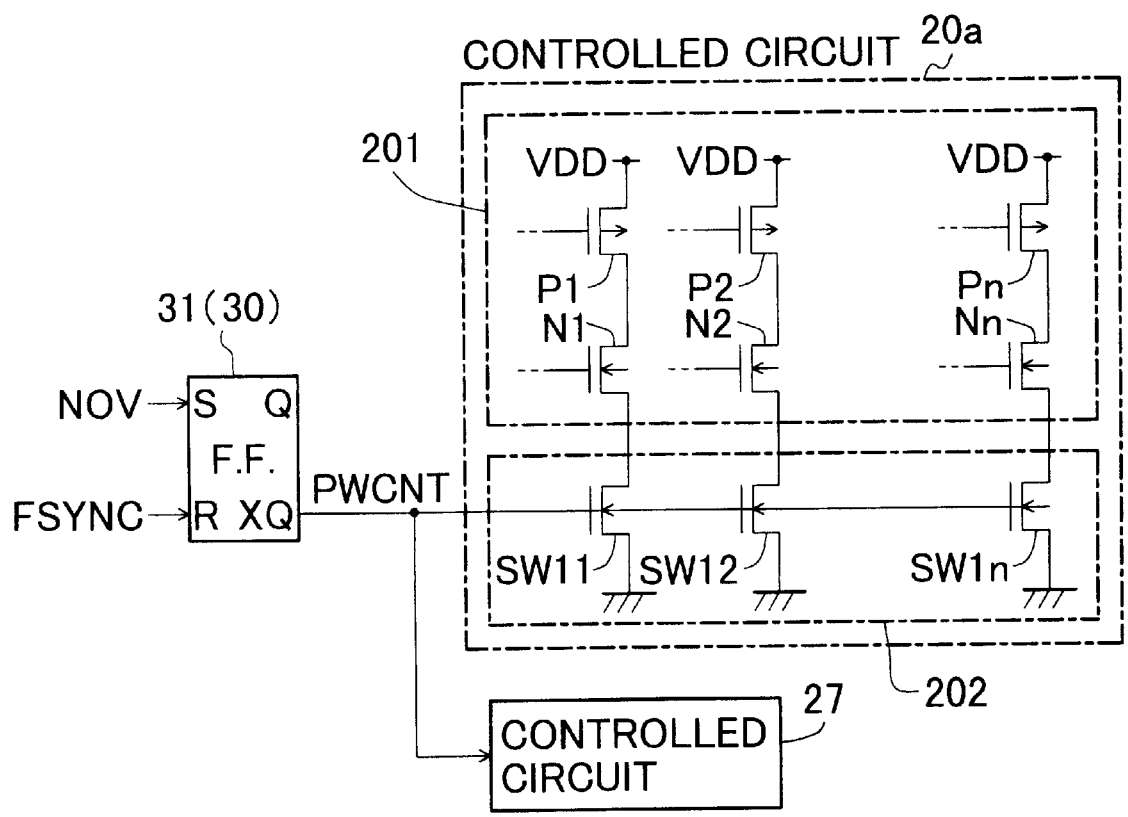
FIG. 2 is a diagram showing an example of structures of a power control circuit and controlled circuits which are shown in FIG. 1.

FIG. 2 shows an example of structures of the power control circuit and the circuits 20a and 27 to be controlled.

The circuit 20a comprises an MTCMOS (Multi-Threshold CMOS) circuit having a pMOS transistor Pi, an nMOS transistor Ni and an nMOS transistors SW1i for each i where i=1 to n, serially connected between a power supply line VDD and a ground line. A main circuit 201 is formed by connecting among n pairs of the CMOS circuits with wires not illustrated, while a switching circuit 202 is formed by connecting gates of nMOS transistors SW11 to SW1n in common. To the gates of the nMOS transistors SW11 to SW1n, a power control signal PWCNT is provided from an inverted output XQ of an RS flip-flop circuit 31. The RS flip-flop circuit 31 forms the power control circuit 30 of FIG. 1 and receives the no-voice detect pulse NOV and the frame synchronization pulse FSYNC at a set input S and a reset input R thereof, respectively.

The circuit 27 has a similar structure to that of the circuit 20a. Now, an operation of such a structure of the first embodiment described above will be described with reference to FIGS. 3A and 3B.

Figure 3:
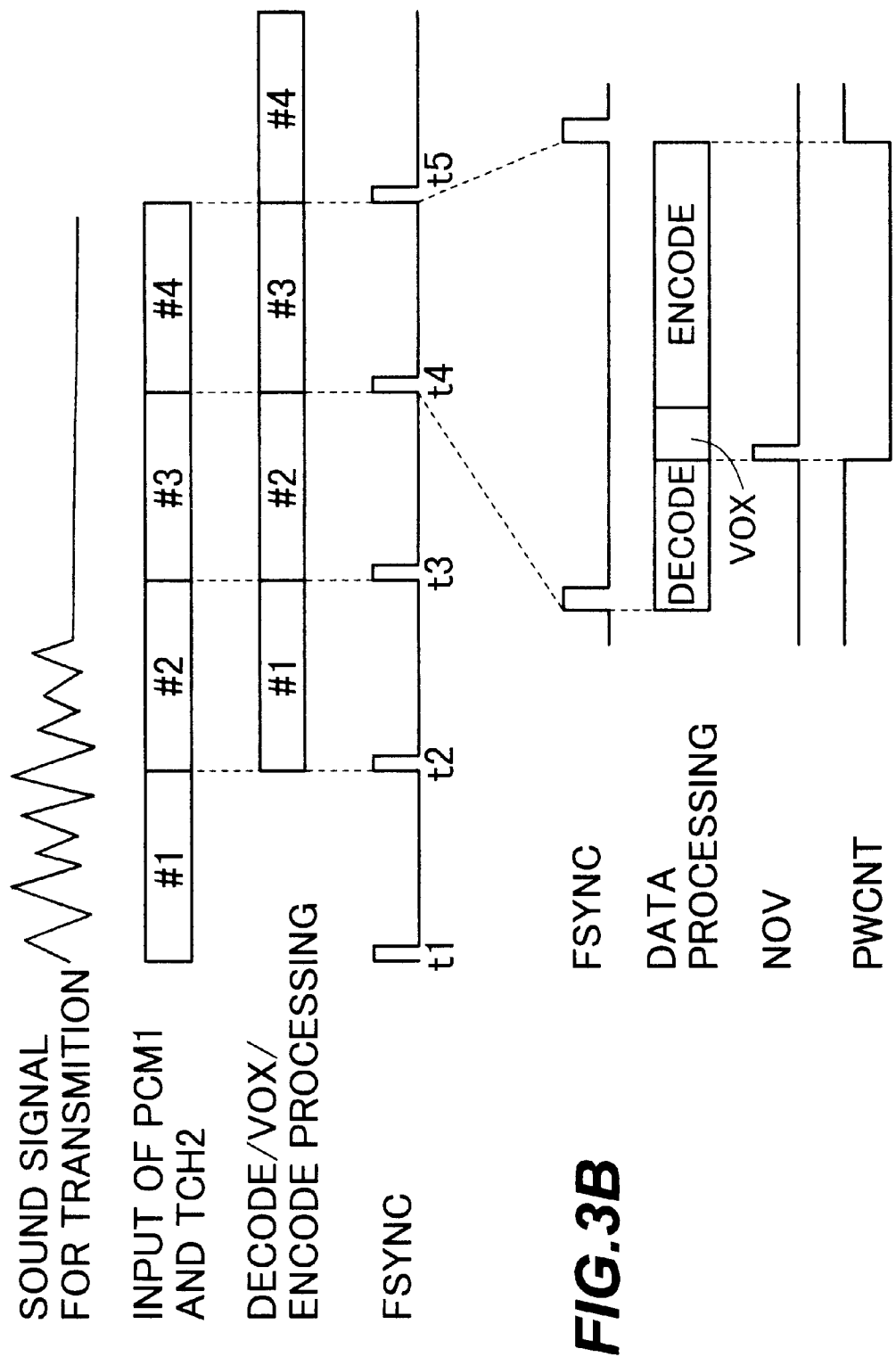
FIGS. 3A and 3B are timing charts illustrating an operation for controlling electric power in the circuit shown in FIG. 1.

On the one hand, such a sound signal as shown in FIG. 3A is provided from the microphone 10 of FIG. 7 to the audio interface 11, thereby amplified, sampled and converted into a digital value, and thereafter provided to the sound coder/decoder circuit 12A of FIG. 1 as the sound data PCM1. On the other hand, the frame assemble/disassemble circuit 13 of FIG. 7 provides the encoded data TCH2 to the sound coder/decoder circuit 12A of FIG. 1. FIG. 3A shows pairs of pieces of the sound data PCM1 and the encoded data TCH2 as frames #1 through #4, although the data are not yet in the form of frames since the frame assemble/disassemble circuit 13 of FIG. 7 processes the data into frames. The DMA request signals DMARQ11 and DMAQ21 are provided to the MPU 20 upon conversion of the data into parallel data at the S/P converter circuits 23 and 24, and the sound data PCM1 and the encoded data TCH2 are written into the memory 22 with DMA mode.

The RS flip-flop circuit 31 is reset by the frame synchronization pulse FSYNC, so that the power control signal PWCNT becomes a high level "H" and the nMOS transistors SW11 to SW1n of the switching circuit 202 and corresponding portions of the circuit 27 accordingly turn on.

In synchronization with the frame synchronization pulse FSYNC, the MPU 20 processes the sound data PCM1 and the encoded data TCH2 which were written into the memory 22 during an immediately preceding frame period. For example, during period t4 to t5, the MPU 20 processes the sound data PCM1 and the encoded data TCH2, which were written into the memory 22 during periods t3 to t4, in an order shown in FIG. 3B.

That is, the MPU 20 reads the encoded data TCH2, converts the same into the sound data PCM2, writes the sound data PCM2 in the memory 22, and performs VOX processing to examine if any sound exists in one frame of the sound data PCM1. Next, the MPU 20 reads the sound data PCM1, converts the same into the encoded data TCH1, and writes the encoded data TCH1 in the memory 22. During the VOX processing, for example, if a plurality of pieces of sound data which were sampled from one frame of the sound data PCM1 are all equal to or smaller than a predetermined value, the MPU 20 determines that this frame does not include a sound and outputs the no-voice detect pulse NOV.

The no-voice detect pulse NOV sets the RS flip-flop circuit 31 of FIG. 2, so that the power control signal PWCNT becomes a low "L" and the nMOS transistors SW11 to SW1n turn off. In the circuit 27 as well, circuits corresponding to the switching circuit 202 turn off. This prevents unnecessary encoding and moreover a leak current from the power supply line VDD to the ground line within the circuits 20a and 27, which in turn reduces a wasteful consumption of electric power.

At a time t5, the frame synchronization pulse FSYNC resets the RS flip-flop circuit 31, so that the power control signal PWCNT becomes "H" and the nMOS transistors SW11 to SW1n of the switching circuit 202 and the corresponding portions of the circuit 27 accordingly turn on. This makes it possible to process the next frame.

Second Embodiment

Figure 4:
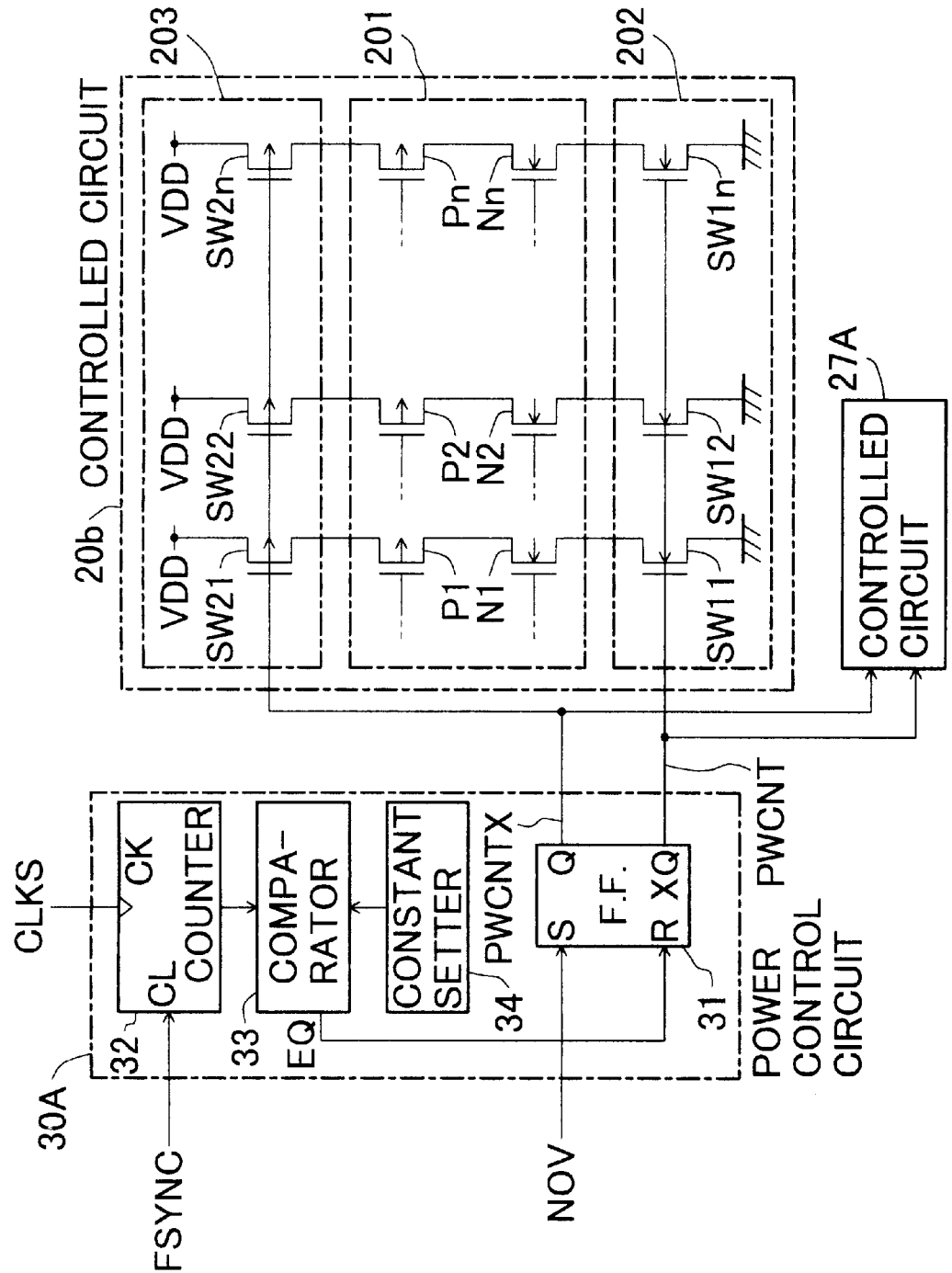
FIG. 4 is a diagram showing a power control circuit and controlled circuits according to a second embodiment of the present invention.
Figure 5:
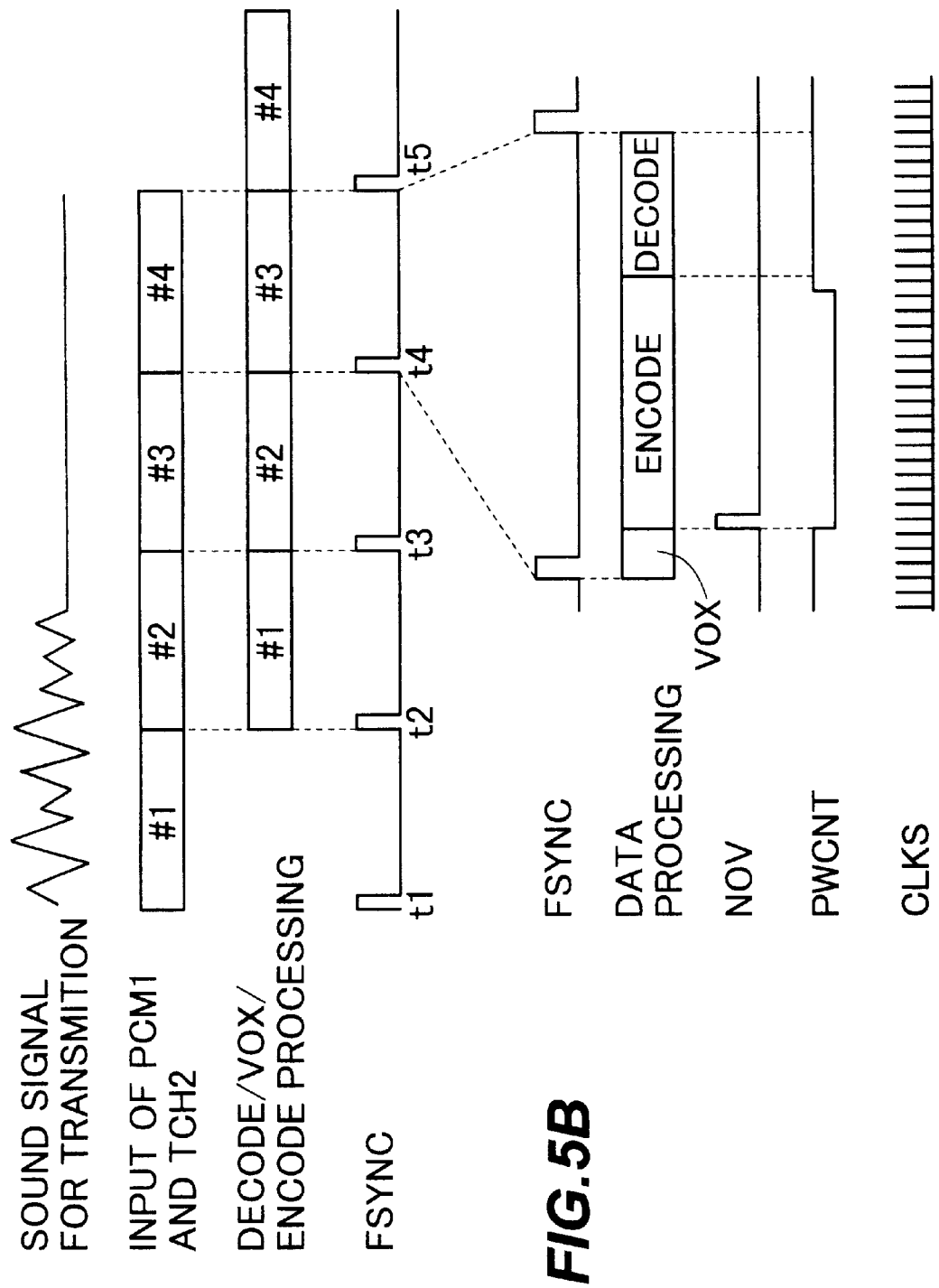
FIGS. 5A and 5B are timing charts illustrating an operation for controlling electric power in the second embodiment.

It needs that encoding follows VOX processing, but decoding can be performed after encoding as shown in FIG. 5B. In such a case, after cutting off electric power supply to the circuit 20a in response to the no-voice detect pulse NOV, it is necessary to resume electric power supply before starting decoding. To this end, in the second embodiment, it is performed to count a sound sampling pulse CLKS shown in FIG. 5B which is used in the audio interface circuit 11 of FIG. 7 to judge a point of time to return the power control signal PWCNT to "H". FIG. 4 shows a power control circuit 30A and controlled circuits 20b and 27A for embodying this.

The circuit 20b is the same as the circuit 20a of FIG. 2 except that it further comprises a switching circuit 203 in which pMOS transistors SW21 to SW2n are connected between the power supply line VDD and PMOS transistors P1 to Pn. Gates of the pMOS transistors SW21 to SW2n are connected in common to a non-inverted output Q of the RS flip-flop circuit 31, from which a power control signal PWCNTX is provided. As same as in FIG. 2, the no-voice detect pulse NOV is provided to a set input S of the RS flip-flop circuit 31.

The controlled circuit 27A has a similar structure to that of the circuit 20b.

In a power control circuit 30A, the sound sampling pulse CLKS is provided to a clock input CK of a counter 32 and counted by the counter 32, and the count is provided to a comparator 33. The count is initialized by the frame synchronization pulse FSYNC which is provided to a clear input CL of the counter 32. The comparator 33 compares the count with a value which is set by a constant setting part 34, and outputs a coincident signal EQ when the two values are identical to each other. The coincident signal EQ is provided to a reset input R of the RS flip-flop circuit 31.

The structure of the second embodiment is otherwise the same as that of the first embodiment.

Now, an operation according to the second embodiment having such a structure described above will be described with reference to FIGS. 5A and 5B.

A count of the counter 32 is initialized by the frame synchronization pulse FSYNC. The RS flip-flop circuit 31 is reset at the beginning, so that the power control signals PWCNT and PWCNTX are "H" and "L," respectively, and the nMOS transistors SW11 to SW1n of the switching circuit 202, the pMOS transistors SW21 to SW2n of the switching circuit 203 and corresponding portions of the circuit 27A are accordingly turned on.

During the periods t4 to t5, for instance, the MPU 20 processes data which are within the memory 22 of FIG. 1 in an order shown in FIG. 5B.

That is, the MPU performs VOX processing which examines if one frame of the sound data PCM1 includes sound data. In the case when silence is not detected during the VOX processing, next the MPU 20 reads the sound data PCM1, converts the same into the encoded data TCH1, and writes the encoded data TCH1 in the memory 22. Following this, the MPU 20 reads the encoded data TCH2, converts the same into the sound data PCM2, and writes the sound data PCM2 into the memory 22.

In the case when silence is detected during the VOX processing, the no-voice detect pulse NOV is outputted from the MPU 20. This sets the RS flip-flop circuit 31, so that the power control signals PWCNT and PWCNTX become "L" and "H," respectively, and the nMOS transistors SW11 to SW1n and the pMOS transistors SW21 to SW2n accordingly turn off. In the circuit 27A as well, portions corresponding to the switching circuits 202 and 203 turn off. This prevents unnecessary encoding and reduces a wasteful consumption of electric power.

When a count of the counter 32 becomes equal to an output from the constant setting part 34, the coincident signal EQ resets the RS flip-flop circuit 31, so that the power control signals PWCNT and PWCNTX return to "H" and "L," respectively. This makes it possible to convert the encoded data TCH2 into the sound data PCM2.

Third Embodiment

Figure 6:
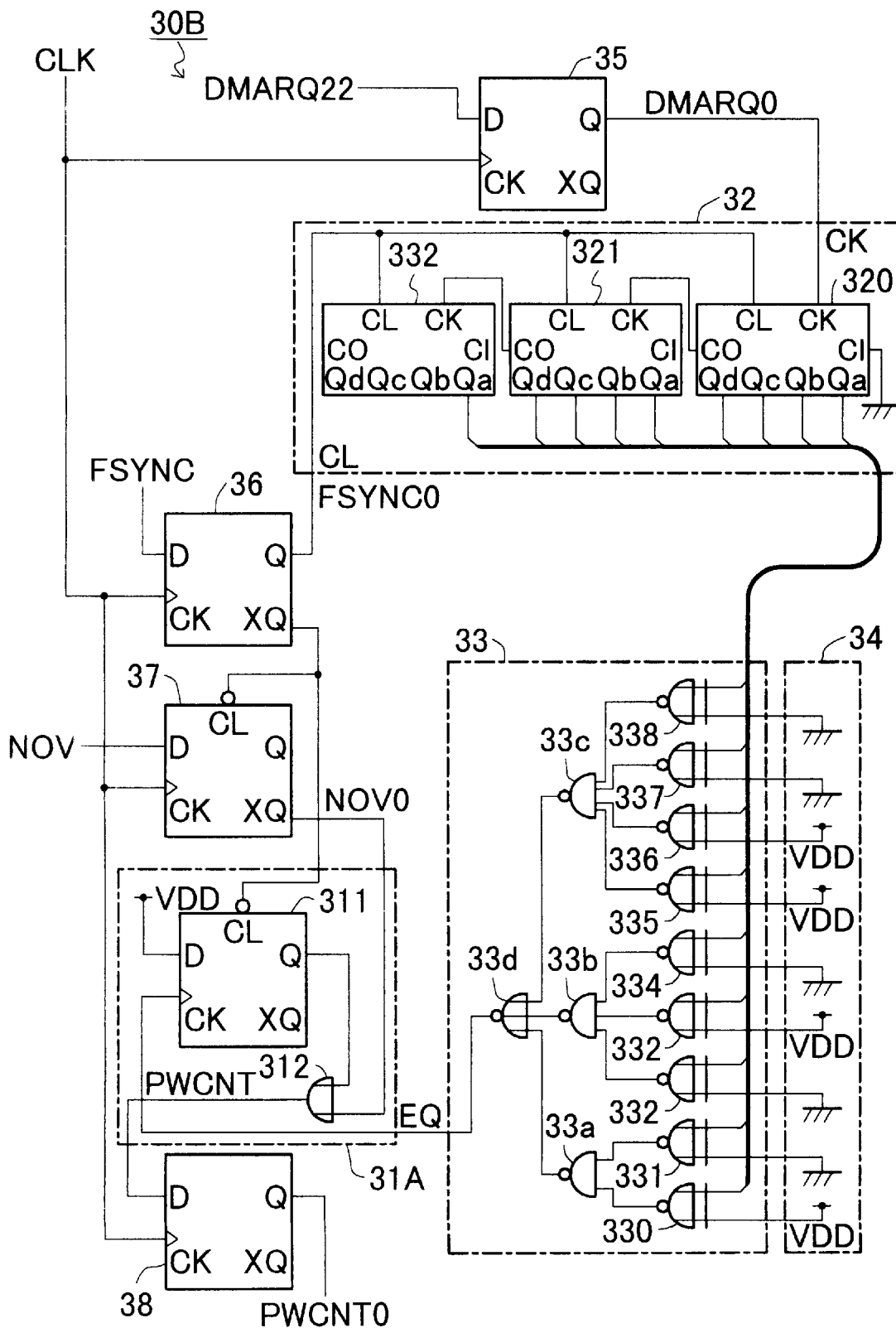
FIG. 6 is a diagram showing a power control circuit according to a third embodiment of the present invention.

FIG. 6 shows a power control circuit 30B according to a third embodiment of the present invention.

In this circuit, flip-flop circuits 35, 36, 37 and 38 synchronize the DMA request signal DMARQ22, the frame synchronization pulse FSYNC, the no-voice detect pulse NOV and the power control signal PWCNT with a system clock CLK and output signals DMARQO, FSYNCO, NOVOX and PCNTO, respectively. A frequency of the system clock CLK is sufficiently higher than that of the DMA request signal DMARQ22. The DMA request signal DMARQO and the frame synchronization pulse FSYNCO are provided to the clock input CK and the clear input CL of the counter 32, respectively. The power control signal PWCNTO is used instead of the power control signal PWCNT which is used in the first or the second embodiment. A pulse number of the DMA request signal DMARQO within one frame is 320, for example. In accordance with this, the counter 32 is formed by cascade connection of 4-bit counters 320, 321 and 322. The comparator 33 is formed by exclusive NOR gates 330 to 338 at an input stage, NAND gates 33a to 33c at an intermediate stage, and a NOR gate 33d at an output stage. The constant setting part 34 is embodied by arranging the ground line at "L" and the power supply line VDD at "H." A hold circuit 31A is formed by a D flip-flop circuit 311 and an OR gate 312. In the D flip-flop circuit 311, the data input D, the clear input CL and the clock input CK are connected to the power supply line VDD, an inverted output XQ of the D flip-flop circuit 36 and an output of the NOR gate 33d, respectively. A non-inverted output Q of the D flip-flop circuit 311 and an inverted output XQ of the D flip-flop circuit 37 are connected to inputs of the OR gate 312. An output from the OR gate 312 is provided to the data input D of the D flip-flop circuit 38, as the power control signal PWCNT.

Now, an operation of the power control circuit 30B having such a structure above will be described.

The frame synchronization pulse FSYNCO and its complement signal initialize the counter 32 and the D flip-flop circuits 37 and 311, so that the inverted output XQ of the D flip-flop circuit 37 and the non-inverted output Q of the D flip-flop circuit 311 become "H" and "L," respectively. The power control signal PWCNT accordingly becomes "H." If silence is detected, the no-voice detect pulse NOV becomes "H." The no-voice detect pulse NOVO thereafter becomes "L" with a rise of a CLK so that the power control signal PWCNT becomes "L." At the timing of the next rise of the system clock CLK, the power control signal PWCNTO becomes "L."

When an output from the counter 32 coincides with an output from the constant setting part 34, the coincident signal EQ changes to "H" so that the power control signal PWCNT becomes "H." Next, at the timing of the rise of the system clock CLK, the power control signal PWCNTO returns to "H."

Although preferred embodiments of the present invention has been described, it is to be understood that the invention is not limited thereto and that various changes and modifications may be made without departing from the spirit and scope of the invention.

For instance, the switching circuits for controlling electric power, which is disposed within the controlled circuits, may include one transistor switch for each block. If there is a flip-flop circuit within the block in such a structure, contents held in the flip-flop circuit may be transferred (i.e., saving) to the memory 22 for example before turning off electric power of the controlled circuit, and immediately after turning on electric power of the controlled circuit, the contents may be read from the memory 22 and held (i.e., restoring) in the flip-flop circuit. To perform such restoring, electric power of the controlled circuit is turned on before the frame synchronization pulse is generated, using the power control circuit according to the second or the third embodiment instead of that according to the first embodiment. In this case and in FIG. 2 or 5, a circuit which is to hold data may be removed from circuits which are to be switched on/off, thereby saving and restoration of data is not necessary.

Instead of the signal DMARQ22 of FIG. 6, the signal DMARQ11 or a signal obtained by frequency-dividing the system clock CLK may be used.

What is claimed is:

1. A sound coder/decoder circuit for encoding sound data to be transmitted and decoding received and encoded sound data, during each one cycle comprising:

silent judging means for making a judgement whether said sound data to be transmitted within said one cycle are silent data, before encoding said sound data to be transmitted;

a controlled circuit having a circuit for encoding said sound data to be transmitted and having a switching circuit for powering on/off said circuit for encoding; and power controlling means for turning off said switching circuit to power off said circuit for encoding during a time for encoding within said one cycle, when said judgement is that said sound data to be transmitted are silent data;

wherein said one cycle is a cycle of a frame synchronization pulse, and wherein said power control means includes:
  a counter circuit for counting a clock, said counter circuit being initialized by said frame synchronization pulse;

a constant setting part for providing a set value;

a comparator circuit for activating a coincident signal when a count of said counter circuit coincides with said set value; and a flip-flop circuit to be set to one state so as to cause said switching circuit to turn off when said judgement is that said sound data to be transmitted are silent data and to be set to another state so as to cause said switching circuit to turn on when said coincident signal becomes activate.

2. A sound coder/decoder circuit according to claim 1, further comprising:

an MPU;

a memory; and a serial-parallel converter circuit for converting said sound data to be transmitted from serial data into parallel data, providing a DMA request signal to said MPU and transmitting said sound data converted into said parallel data to said memory with DMA mode;

wherein said clock is said DMA request signal.

3. A sound coder/decoder circuit according to claim 1, further comprising:

an MPU;

a memory; and a parallel-serial converter circuit for providing a DMA request signal to said MPU, reading decoded sound data from said memory with DMA mode and converting said sound data which are read from said memory from parallel data into serial data;

wherein said clock is said DMA request signal.

4. A sound coder/decoder circuit according to claim 1, wherein said clock is a sound sampling pulse for generating said sound data to be transmitted.

5. A sound coder/decoder circuit for encoding sound data to be transmitted and decoding received and encoded sound data, during each one cycle, comprising:

silent judging means for making a judgement whether said sound data to be transmitted within said one cycle are silent data, before encoding said sound data to be transmitted;

a controlled circuit having a circuit for encoding said sound data to be transmitted and having a switching circuit for powering on/off said circuit for encoding; and power controlling means for turning off said switching circuit to power off said circuit for encoding during a time for encoding within said one cycle, when said judgement is that said sound data to be transmitted are silent data;

wherein said controlled circuit includes a plurality of circuits each of which have a switching MOS transistor of said switching circuit and have a CMOS circuit serially connected to said switching MOS transistor, said switching MOS transistor being turned on/off so as to turned on/off said switching circuit, said circuit for encoding including said CMOS circuit.

6. A mobile communication device comprising a sound coder/decoder circuit for encoding sound data to be transmitted and decoding received and encoded sound data, during each one cycle, said sound coder/decoder circuit including:

silent judging means for making a judgement whether said sound data to be transmitted within said one cycle are silent data, before encoding said sound data to be transmitted;

a controlled circuit having a circuit for encoding said sound data to be transmitted and having a switching circuit for powering on/off said circuit for encoding; and power controlling means for turning off said switching circuit to power off said circuit for encoding during a time for encoding within said one cycle, when said judgement is that said sound data to be transmitted are silent data;

wherein said one cycle is a cycle of a frame synchronization pulse, and wherein said power control means includes:

a counter circuit for counting a clock, said counter circuit being initialized by said frame synchronization pulse;

a constant setting part for providing a set value;

a comparator circuit for activating a coincident signal when a count of said counter circuit coincides with said set value; and a flip-flop circuit to be set to one state so as to cause said switching circuit to turn off when said judgement is that said sound data to be transmitted are silent data and to be set to another state so as to cause said switching circuit to turn on when said coincident signal becomes activated.

7. A mobile communication device comprising a sound coder/decoder circuit for encoding sound data to be transmitted and decoding received and encoded sound data, during each one cycle, said sound coder/decoder circuit including:

silent judging means for making a judgement whether said sound data to be transmitted within said one cycle are silent data, before encoding said sound data to be transmitted;

a controlled circuit having a circuit for encoding said sound data to be transmitted and having a switching circuit for powering on/off said circuit for encoding; and power controlling means for turning off said switching circuit to power off said circuit for encoding during a time for encoding within said one cycle, when said judgement is that said sound data to be transmitted are silent data;

wherein said one cycle is a cycle of a frame synchronization pulse, and wherein said power control means includes:

a counter circuit for counting a clock, said counter circuit being initialized by said frame synchronization pulse;

a constant setting part for providing a set value;

a comparator circuit for activating a coincident signal when a count of said counter circuit coincides with said set value; and a flip-flop circuit to be set to one state so as to cause said switching circuit to turn off when said judgement is that said sound data to be transmitted are silent data and to be set to another state so as to cause said switching circuit to turn on when said coincident signal becomes activated.

8. A mobile communication device according to claim 6, further comprising:

an MPU;

a memory; and a serial-parallel converter circuit for converting said sound data to be transmitted from serial data into parallel data, providing a DMA request signal to said MPU and transmitting said sound data converted into said parallel data to said memory with DMA mode;

wherein said clock is said DMA request signal.

9. A mobile communication device according to claim 6, further comprising:

an MPU;

a memory; and a parallel-serial converter circuit for providing a DMA request signal to said MPU, reading decoded sound data from said memory with DMA mode and converting said sound data which are read from said memory from parallel data into serial data;

wherein said clock is said DMA request signal.

10. A mobile communication device according to claim 6, wherein said clock is a sound sampling pulse for generating said sound data to be transmitted.

11. A mobile communication device comprising a sound coder/decoder circuit for encoding sound data to be transmitted and decoding received and encoded sound data, during each one cycle, said sound coder/decoder circuit including:

silent judging means for making a judgement whether said sound data to be transmitted within said one cycle are silent data, before encoding said sound data to be transmitted;

a controlled circuit having a circuit for encoding said sound data to be transmitted and having a switching circuit for powering on/off said circuit for encoding; and power controlling means for turning off said switching circuit to power off said circuit for encoding during a time for encoding within said one cycle, when said judgement is that said sound data to be transmitted are silent data;

wherein said controlled circuit includes a plurality of circuits each of which have a switching MOS transistor of said switching circuit and have a CMOS circuit serially connected to said switching MOS transistor, said switching MOS transistor being turned on/off so as to turned on/off said switching circuit, said circuit for encoding including said CMOS circuit.

* * * * *